UNITED STATES PATENT OFFICE.

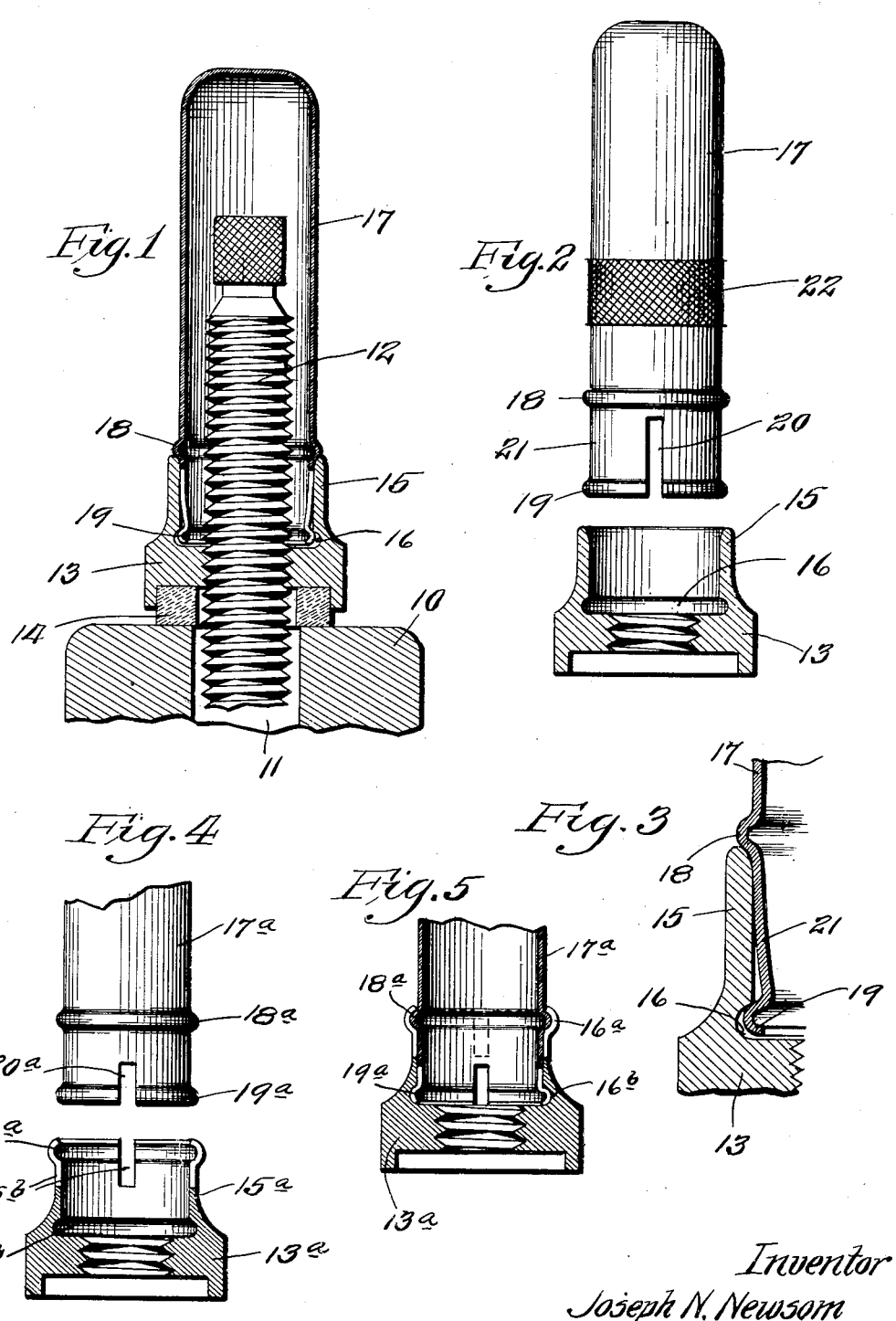

JOSEPH N. NEWSOM, OF ST. LOUIS, MISSOURI, ASSIGNOR TO NEWSOM VALVE COMPANY, OF ST. LOUIS, MISSOURI, A CORPORATION OF MISSOURI.

DUST-CAP FOR PNEUMATIC VALVES.

1,370,474. Specification of Letters Patent. Patented Mar. 1, 1921.

Application filed January 18, 1919. Serial No. 271,795.

*To all whom it may concern:*

Be it known that I, JOSEPH N. NEWSOM, a citizen of the United States, residing at St. Louis, Missouri, have invented a certain new and useful Improvement in Dust-Caps for Pneumatic Valves, of which the following is a full, clear, and exact description, such as will enable others skilled in the art to which it appertains to make and use the same, reference being had to the accompanying drawings, forming part of this specification.

My invention relates to improvements in dust caps for the valves of pneumatic tires and like inflatable devices, the principal object of my invention being to provide a relatively simple and inexpensive dust cap which performs all the functions required of the generally used types of screw caps and yet be much more quickly and easily detached in order to expose the valve stem when the tire or like device is to be inflated or deflated or for the purpose of testing the air pressure within said tire.

Further objects of my invention are to provide a one piece dust cap and construct the same and the member upon which it is locked so that it will be positively locked upon said member without extraneous means and at the same time said cap being capable of ready release or removal; to construct the cap and valve part with which it is associated so as to provide an air, dust and water proof joint between the parts and further, to provide a cap which will embrace the desirable features of simplicity, efficiency and durability and which may be manufactured and marketed at a minimum expense.

The dust cap herein disclosed is an improvement upon the dust cap forming the subject-matter of an application for patent filed by me May 18th, 1917, Serial No. 169,455.

With the foregoing and other objects in view, my invention consists in certain novel features of construction and arrangement of parts hereinafter more fully described and claimed, and illustrated in the accompanying drawings, in which—

Figure 1 is a vertical section of a dust cap of my improved construction and showing the same associated with a nut which latter is positioned upon that portion of the valve which projects through the wheel rim.

Fig. 2 is a side elevational view of the cap detached from the nut and with the latter in section.

Fig. 3 is an enlarged detail section showing a portion of the wall of the dust cap and a part of the nut with which said cap is associated.

Fig. 4 is an elevational view of the lower portion of a modified form of the dust cap and the nut with which the same is associated.

Fig. 5 is a sectional view of the modified form of cap and showing the same in position upon the valve locking nut.

Referring by numerals to the accompanying drawings and particularly the construction illustrated in Figs. 1 to 3, inclusive, 10 designates a wheel felly provided with the usual opening 11 through which projects the externally threaded tubular body 12 of a pneumatic valve.

Screw seated on the projecting portion of the valve member 12 is a nut 13 carrying on its under side a packing ring 14 of leather or analogous material, the latter being intended to fit snugly against the inner face of felly 10 around the opening 11 therein and thus serving to prevent dust, water and other foreign matter from entering the valve stem opening.

Formed integral with the top of nut 13 is an annular flange or ring 15 and formed in the inner face of the latter and immediately adjacent to the point where said flange unites with the body of the nut 13 is an annular groove 16.

The dust cap contemplated by my invention is preferably spun or pressed from sheet metal and the body 17 of said cap is in the form of a hollow cylinder closed at its upper end. Formed on the lower portion of the body of the cap by pressing the metal forming the wall thereof outwardly is an annular bead 18 and a similar bead 19 is formed at the extreme lower end of the wall of the cap.

The lower portion of the wall of the cap or that portion below bead 18 is provided with a series of longitudinally disposed slots 20 and thus portions of the wall between these slots constitute resilient fingers 21 which fit snugly within the annular wall or flange 15 when the cap is applied for use.

It will be understood that the external diameter of the cap or that portion between the beads 18 and 19 is a minute degree less than the internal diameter of the annular flange or ring 15 so that when the cap is applied to the nut, the lower portion of said cap or that portion comprising the resilient fingers 21 fits snugly within the flange 15.

The distance between the lower edge of the rib 18 and the upper edge of rib 19 is slightly less than the distance between the upper edge of flange 15 and the edge between the top of groove 16 and the inner face of flange 15 and by virtue of this construction, the rib 19 will not entirely seat itself in the groove 16 when the lower portion of the cap is inserted in flange 15. This condition or position of the parts is illustrated in Fig. 5 and as the rib 19 is but partially seated in groove 16 and the tendency of the lower portions of the resilient fingers 21 is to move outwardly there will be a constant downward pull upon the entire body of the cap with the result that a very tight joint is maintained between the lower edge of the rib 18 and the upper edge of flange 15.

Obviously, this tight joint will be effective in excluding dust, water and like foreign substance. A portion of the outer face of the body of the cap above rib 18 is milled or corrugated as designated by 22, thus providing a roughened surface which may be readily grasped when the cap is detached from the nut.

In the modified construction illustrated in Figs. 3 and 4, the cap 17ª is provided on its lower portion with ribs 18ª and 19ª and that portion of the wall of the cap between said ribs is provided with longitudinally disposed slots such as 20ª. The nut 13ª with which this cap is associated is provided with an integral annular flange or wall 15ª the upper portion of which is slotted vertically as designated by 15ᵇ, and formed in the inner face of the annular wall or flange at its top and bottom are the annular grooves 16ª and 16ᵇ, respectively. When this form of cap is applied to the nut, the beaded lower end of said cap is inserted within the annular flange or wall 15ª during which action those portions of the walls of the cap and flange between the slots 20ª and 15ᵇ yield slightly in opposite directions and when the cap is finally forced to its seat, rib 18ª occupies the annular groove 16ª in the top of flange 15ª and rib 19ª occupies annular groove 16ᵇ. This construction provides a double lock between the cap and nut with the result that said cap is very securely anchored to said nut.

A cap of my improved construction may be easily and cheaply manufactured, may be quickly applied to or removed from the valve stem and lock nut therefor and combines with said lock nut to form an effective protection for that portion of the valve stem or body projecting through the wheel rim.

It will be readily understood that minor changes in the size, form and construction of the various parts of my improved dust cap may be made and substituted for those herein shown and described without departing from the spirit of my invention, the scope of which is set forth in the appended claims.

I claim:

1. The combination with a pneumatic valve part in which is formed a recess and there being an annular groove within said recess, of a valve cap one end of which is adapted to be inserted in said recess, the wall of said cap being provided with a pair of annular beads, the distance between which is slightly less than the distance between the top of the annular groove within the recess and the top of said recess.

2. The combination with a valve part having a recess in the lower portion of which is formed an annular groove, of a valve cap provided on its open end with a series of resilient fingers adapted to enter said recess the ends of said fingers being adapted to enter the annular groove in said recess, the wall of said cap being provided with a shoulder above said fingers, and the distance between said shoulder and the end portions of said fingers being slightly less than the distance between the top of the groove in the recess and the edge of the wall at the top of said recess.

3. In combination with a pneumatic valve part provided with a recess, an annular groove within said recess, a valve cap one end of which is adapted to be inserted within the recess, said cap being provided with an annular bead, and means for allowing said head to enter the groove in the recess but partially when the cap is inserted in said recess.

In testimony whereof I hereunto affix my signature this 28th day of December, 1918.

JOSEPH N. NEWSOM.